US010597318B2

(12) United States Patent
Hanson

(10) Patent No.: US 10,597,318 B2
(45) Date of Patent: Mar. 24, 2020

(54) BIOREACTOR FOR SULFATE REDUCTION

(71) Applicant: Clearwater BioLogic LLC, Babbitt, MN (US)

(72) Inventor: Jeffrey John Hanson, Babbitt, MN (US)

(73) Assignee: Clearwater BioLogic LLC, Babbitt, MN (US)

(*) Notice: Subject to any disclaimer, the term of this patent is extended or adjusted under 35 U.S.C. 154(b) by 27 days.

(21) Appl. No.: 16/029,119

(22) Filed: Jul. 6, 2018

(65) Prior Publication Data
US 2020/0010346 A1 Jan. 9, 2020

(51) Int. Cl.
C02F 3/10 (2006.01)
C02F 3/34 (2006.01)
C02F 103/10 (2006.01)
C02F 103/00 (2006.01)
C02F 101/10 (2006.01)

(52) U.S. Cl.
CPC .............. C02F 3/108 (2013.01); C02F 3/109 (2013.01); C02F 3/345 (2013.01); C02F 2101/101 (2013.01); C02F 2103/007 (2013.01); C02F 2103/10 (2013.01); C02F 2203/008 (2013.01)

(58) Field of Classification Search
None
See application file for complete search history.

(56) References Cited

U.S. PATENT DOCUMENTS

| 4,258,097 | A | * | 3/1981 | Benedyk | D04H 1/46 28/107 |
| 5,137,460 | A | * | 8/1992 | Middleton | G09B 25/00 206/579 |
| 6,030,685 | A | * | 2/2000 | Schweighardt | D02G 3/445 428/92 |
| 6,666,436 | B1 | * | 12/2003 | Lerner | B01D 53/18 261/95 |
| 7,854,843 | B2 | * | 12/2010 | Pehrson | C02F 3/006 210/605 |
| 2015/0101981 | A1 | * | 4/2015 | Lennox | C02F 3/06 210/615 |
| 2017/0334752 | A1 | * | 11/2017 | Behrens | C02F 1/5236 |

OTHER PUBLICATIONS

Hudak, et al., "The MnDRIVE Transdisciplinary Project Implementation of Smart Bioremediation Technology to Reduce Sulfate Concentrations in NE Minnesota Watersheds", URL: https://conservancy.umn.edu/bitstream/handle/11299/190404/TR-2017-17.pdf?sequence=1&isAllowed=y, Natural Resources Research Institute, University of Minnesota, Duluth, Jul. 14, 2017, 155 pages.
Neculita, et al, "Passive treatment of acid mine drainage in bioreactors using sulfate-reducing bacteria: Critical review and research needs", Journal of Environmental Quality, Jan. 9, 2007, 16 pages.

(Continued)

Primary Examiner — Chester T Barry
(74) Attorney, Agent, or Firm — Brooks, Cameron & Huebsch, PLLC

(57) ABSTRACT

Embodiments of the present disclosure are directed towards a bioreactor, a floating bioremediation platform system, and a process for reducing sulfates, in surface water.

18 Claims, 4 Drawing Sheets

(56) References Cited

OTHER PUBLICATIONS

Doshi, "Bioremediation of Acid Mine Drainage Using Sulfate-Reducing Bacteria", URL: https://clu-in.org/download/studentpapers/s_doshi-srb.pdf, US Environmental Protection Agency, Office of Solid Waste and Emergency Response and Office of Superfund Remediation and Technology Innovation, Aug. 2006, 72 pages.

Kousi, et al., "Sulphate-reducing bioreactors: current practices and perspectives", URL: http://old-2017.metal.ntua.gr/uploads/2748/1298/IWA-bywp2015.pdf, International Water Association, (IWA), May 10, 2015, 9 pages.

Miller, "Reduction of Sulfate Concentrations in Neutral Mine Effluent", URL: https://pdfs.semanticscholar.org/5512/3f8b4800ee03cbf2656f7050136665a63cdb1.pdf, University of Nevada Dept. of Conservation and Natural Resources Website. Carson City, NV.. Sep. 27, 2005, 4 pages.

"Passive and Semi-Active Treatment of Acid Rock Drainage From Metal Mines—State of the Practice", URL: https://www3.epa.gov/region1/superfund/sites/elizmine/43547.pdf, U.S. Army Corps of Engineers, Apr. 2, 2003, 113 pages.

\* cited by examiner

BIOREACTOR FOR SULFATE REDUCTION

FIELD OF DISCLOSURE

The present disclosure relates generally to a bioreactor. More specifically, but without limitation, the disclosure relates to a bioreactor for the reduction of sulfates from surface waters.

BACKGROUND

Surface waters, including lakes, rivers, wetlands, and all of their connecting waterways, can collect sulfates through geological weathering of local rock, atmospheric deposition from local and distant coal-burning power plants, and from activities that disturb and expose sulfur-bearing rock, like mining and roadbuilding. For example, many northeastern Minnesota water bodies contain sulfate concentrations that exceed current state regulatory levels, and the removal of excess sulfate and remediation of those sites is a paramount concern in Minnesota, among other places. For instance, native wild rice, *Zizania palustris*, grows well in water containing sulfate at concentrations at or below 10 mg/L but is relatively sparse in waters containing sulfate at 50 mg/L or more. While sulfate and other contaminants can be effectively removed from water by municipal or industrial waste water treatment plants, these systems are technologically complex, require high capital and operational costs, and demand continuous energy supplies. Notably, many of these waste treatment schemes include biological components, which use microbial metabolism to lower the concentrations of specific environmental contaminants, like phosphates, nitrates, or sulfates.

Given its reactivity, sulfur will rapidly participate in a variety of chemical reactions, depending on physico-chemical conditions, e.g. the presence of air (oxygen), water, and metals, and it is an active agent in the metabolism and structural biology of organisms ranging from bacteria to vertebrates. Therefore, it is not surprising that natural sulfur cycling through abiotic and biotic realms is usually environmentally benign and that a variety of stable ecosystems thrive in a wide range of sulfate levels, usually reflecting the underlying geology of the region. However, large releases of sulfur into the air through fossil fuel combustion, or into air or water from mining, road-building, and other processes that involve geological disturbance, can present a hazard. For example, when sulfur is exposed to air and water, sulfuric acid will form to some degree, which can reduce the pH of the terrestrial or aquatic matrix. Small amounts of acid produced by natural weathering are often neutralized by basic soil components or diluted by precipitation, and some fortunate regions, like northeast Minnesota, have sufficient geologic buffering capacity to eliminate most sulfate acidification. However, in other areas, exposure of large quantities and/or high concentrations of sulfur to air and water can generate sulfuric acid concentrations in precipitation and runoff that exceed natural buffering or dilution capacity. Acidified precipitation originating from coal-fired power plants and runoff from newly exposed rocks in mining operations has caused severe disruptions in sensitive aquatic and terrestrial ecosystems that have limited natural buffering capacity.

Sulfate is a significant issue for many mining operations. A specific type of sulfate problem is acute on the Iron Range in northeast Minnesota. Iron ore mining has been happening there for close to 200 years. Since the 1950's it has largely been a low grade of iron ore, taconite, that has been mined in this region. Taconite must be crushed and magnetically concentrated to form high iron content taconite pellets. The crushed taconite and the undesirable tailings are all transported as a water slurry. In the taconite ore there is a small quantity of metal sulfide ore, primarily pyrite. When in contact with water and air these sulfide ores oxidize to form sulfate in the water that is pumped out into the tailings basins. Sulfate concentration in the water is further elevated when a mining operation uses scrubbers to remove sulfur from their air emissions. The result is that all taconite processing plants in Minnesota have high sulfate concentrations to varying degrees in their tailings basins. Typical sulfate concentrations are from 500 to 2,000 mg/L.

The federal secondary drinking water standard for sulfates in the discharges or seepage from these tailings basins is 250 mg/L. However, if there are wild rice waters downstream of these seepages and discharges, then the applicable standard is 10 mg/L of sulfate in Minnesota. This is the special Minnesota standard for wild rice producing waters because of the damage that sulfate and/or hydrogen sulfide can cause to wild rice.

There is no taconite processing plant in Minnesota today that meets the wild rice standard of 10 mg/L of sulfate in their discharge water, and most do not meet the 250 mg/L standard either. This situation has been allowed to perpetuate until now based on the argument that there was no viable way to remedy the problem. Some have proposed just shutting down the taconite operations that provide 80% of the iron for steel making in the USA. This would be not only an economic disaster, but it would aggravate the sulfate problem further. When a taconite mine stops operating, and its sump pumps stop, the mine pits become mine pit lakes. In these mine pit lakes, water and air gradually oxidize the small concentration of pyrite in the exposed ore to form sulfate. Thus, the taconite mine pit lakes become water bodies high in sulfate. Even with this level of sulfate, these lakes do not typically form acid mine drainage in that they are well buffered with carbonates. This is evidenced by the many mine pit lakes with high sulfate that formed when Eire Mining ceased operations in 2001. These mine pit lakes have sulfate concentrations over 1,000 mg/L and a pH of 7 to 8. It is these waters that are discharged into natural streams that once had wild rice. This sulfate level is far above the Minnesota standard of 10 mg/L, but with no viable remediation available, no remedial action has been taken.

There are now advanced plans for the mining of sulfide ores (Cu, Ni, Ag, Au and others) very near to the taconite mines. PolyMet Mining hopes to be granted their Permit to Mine yet in 2018. For this they have committed to meet the 10 mg/L sulfate discharge limit. PolyMet plans to do this with reverse osmosis. They have proven that it is possible to meet the 10 mg/L standard, and they can afford to do it based on their high value ores.

The precedent has now been set by PolyMet that something can be done about high sulfate concentrations, albeit at an extremely high capital investment and operating cost. The legacy mine pit lakes and current taconite processing plants do not have sufficient revenue to justify reverse osmosis for the water currently being discharged. Several mines are threatening to cease operations if they are required to install and operate reverse osmosis systems for these applications. As mentioned hereinabove, if they do stop mining then the problem only gets worse.

There are many scholarly reports on the well-developed practice of bioremediation using bioreactors for the treatment of Acid Mine Drainage (AMD) or Acid Rock Drainage (ARD). Other commonly used bioreactors are in the form of Permeable Reactive Barrier (PRB) bioreactors to treat nitrates or sulfates. All these bioreactors fall into the two broad categories, namely: 1) organic media bioreactors where the support media and electron donor are the same material, and 2) those with inorganic support media and a separate liquid electron donor feed.

"Compost" bioreactors with organic media that also serve as electron donor are relatively inexpensive to build and relatively passive. But over time the support media is consumed and the electron donor supply decreases. As the organic media decomposes it loses its structure allowing for the forming of preferential flow paths and leads to plugging. At some point they generally need to be dug up and reconstructed.

Bioreactors with inorganic media, such as gravel, do not suffer from media degradation and therefore maintain more consistent flow patterns. For these bioreactors a liquid electron donor is generally used. The bacteria attach themselves to the available surface area of the media and consume the electron donor as it flows past them to convert sulfate to hydrogen sulfide. The hydrogen sulfide produced will react with dissolved metals to form metal sulfide precipitates. These precipitates can plug the bioreactor beds. However, with inorganic gravel media the precipitates can usually be flushed out of the system periodically to restore open flow patterns. Gravel media typically has about 150 $m^2/m^3$ of surface area and 50% void volume. The higher the surface area, the more sulfate-reducing bacteria (SRB) can grow in the bioreactor. The higher the void volume, the higher the retention time for sulfate reduction and the easier water flows through the media without biomass fouling.

The article "Passive Treatment of Acid Mine Drainage in Bioreactors using Sulfate-Reducing Bacteria, Critical Review and Research Needs" published in the *Journal of Environmental Quality*, Jan. 9, 2007 is an excellent summary of both types of bioreactor used in AMD applications. These applications normally have low pH due to the progressive oxidation of iron sulfide, or pyrite, producing progressively more acidity. This low pH further dissolves additional metals into the water stream. In these situations, bioreactors use SRB to increase the pH and to produce $H_2S$ to react with and precipitate out the dissolved metals (such as Cu2+, Zn2+, Cd2+, Pb2+, Ag 2+ and Fe2+). Another characteristic of these bioreactors is that they sequester sulfur in the form of metal sulfide thereby removing sulfur from the effluent water. This article focuses on "passive" treatment and covers primarily compost type bioreactors with organic media.

Another report entitled "Bioremediation of Acid Mine Drainage Using Sulfate-Reducing Bacteria" prepared by Sheela M. Doshi for the U.S. Environmental Protection Agency in 2006 describes the general state of the art at that time. Most of the bioremediation systems described in this report use organic substrate as a slow release electron donor as well as for SRB attachment. The organic substrate is consumed over time losing its structure and porosity. These applications have a low pH with high concentrations of dissolved metals. Therefore, as $H_2S$ is produced in the bioreactors it immediately reacts with the dissolved metal to form metal sulfide precipitates within the bed of the bioreactor. Over time the bioreactor loses its organic substrate attachment media and accumulates metal sulfide precipitates which require it to be cleaned out or reconstructed. One Modular Sulfate-Reducing Bioreactor Design is reviewed where bags of walnut shells are used as a very slow release electron donor and longer-term attachment surface for SRB in a format that can be more easily removed and replaced.

Another bioreactor approach reviewed in this report is the Leviathan Mine Compost-Free Bioreactor system. In this case ethanol was used as a liquid electron donor. Sodium hydroxide and a recycling mode were employed to raise the pH to near neutral pH to enhance SRB growth. With a liquid electron donor they could use an inorganic attachment media in the form of pea gravel. This gravel media had about 50% porosity and 150 $m^2/m^3$ of surface area. The use of this gravel media allowed the metal sulfides that were formed to flow out with the effluent water into a large settling pond for collection. The gravel media was periodically back flushed to eliminate any remaining metal sulfides that might cause fouling. Although the objective of this bioreactor system was not sulfate reduction, it did reduce dissolved metals, and raise pH while also reducing sulfate by about 17%. More importantly, it did demonstrate the workability of a gravel media, a liquid electron donor and the collection of the metal sulfide precipitates in a separate settling pond stage after flushing of the media bed.

In his report "Reduction of Sulfate Concentrations in Neutral Mine Effluent," Glenn C. Miller, Ph.D. at the University of Nevada, Reno, Sep. 27, 2005, explains different approaches to sulfate reduction where the mine effluent is neutral due to sufficient carbonate to neutralize the sulfuric acid produced. Dr. Miller reviews chemical precipitation, ion exchange, reverse osmosis and membrane methods as well as biological sulfate reduction. He concludes that biological sulfate reduction can operate semi-passively and has relatively low capital and operational costs. His cost estimate to reduce sulfate concentrations from 1,500 mg/L to less than 250 mg/L is a cost of $5/1000 gallon not including hydrogen sulfide treatment.

One of the more recent reviews of biological sulfate reduction was a presentation titled "Sulfate-Reducing Bacteria: Current Practices and Perspectives" presented by P. Kousi, E. Remoundaki, A. Hatzikioseyain and M. Tsezos at the IWA Balkan Young Water Professionals, May 10-12, 2015. The conclusions of this review are that SRB can effectively reduce sulfate, reduce acidity and soluble metal species sequestration.

All these prior art bioreactor forms rely on either organic substrate for electron donors and attachment surface media, or a combination of low-cost gravel for attachment media and a liquid electron donor. The performance of these units is limited by the attachment media and substrate used. The organic media and substrate decomposes, is consumed, has changing permeability and must be exchanged after a few years. The gravel has a calculated porosity of about 50% and a limited surface area of about 150 $m^2/m^3$, which demands a very large volume bioreactor to achieve high flow rate and an acceptable retention time.

There is, therefore, a need for higher efficiency, lower cost, positively controllable sulfate reduction systems to address the sulfate issue for the taconite industry. Accordingly, it would be desirable to have a cost effective, self-contained means for use in the reduction of sulfates in surface water.

SUMMARY

The present disclosure provides such a means, and comprises: a bioreactor, comprising:

a liquid-tight vessel having a volume, the liquid-tight vessel having a water inlet and a water outlet;

a non-biodegradable polymeric fibrous media in the liquid-tight vessel, wherein the non-biodegradable polymeric fibrous media is capable of supporting a sulfate-reducing bacterial biofilm and wherein the surface area density of the non-biodegradable polymeric fibrous media in the bioreactor is at least 2000, or is at least 3000, or at least 5000, or at least 6000, square meter ($m^2$) of non-biodegradable polymeric fibrous media per cubic meter volume of the liquid-tight vessel.

In one aspect, this disclosure includes a bioremediation platform system comprising a plurality of bioreactors, wherein a bioreactor comprises:

a liquid-tight vessel having a volume, the liquid-tight vessel having a water inlet and a water outlet;

a non-biodegradable polymeric fibrous media in the liquid-tight vessel, wherein the non-biodegradable polymeric fibrous media is capable of supporting a sulfate-reducing bacterial biofilm and wherein the bioreactor includes an amount of the non-biodegradable polymeric fibrous media to provide a surface area density of at least 2000, or at least 3000, or at least 5000, or at least 6000 square meter ($m^2$) of the non-biodegradable polymeric fibrous media per cubic meter volume of the liquid-tight vessel.

In another aspect, this disclosure includes a process for removing sulfate from water, the process comprising:

providing water with sulfate to the water inlet of a bioreactor, as described hereinabove, where the non-biodegradable polymeric fibrous media in the liquid-tight vessel supports a sulfate reducing bacterial biofilm;

moving the water through the volume of the liquid-tight vessel using the water inlet and the water outlet; and supplying the sulfate reducing bacterial biofilm with an electron donor under conditions such that the at least one sulfate in the water is converted to a different chemical species.

Surprisingly, the bioreactor, bioreactor system and method of their use as provided in this disclosure may achieve total reduction of sulfate from surface water, in some cases at near freezing temperatures.

Advantageously, the bioreactor and system of this disclosure provide much more surface area for bioattachment compared to legacy systems. In addition, the bioreactor and system of this disclosure may employ relatively inexpensive materials and are further environmentally friendly in that they may employ recycled materials, which also provide a cost advantage.

The advantages of this bioremediation system may include low-power demand that can be satisfied by on-site solar photovoltaic panels or gravity flow, year-round operation with minimal need for human intervention, reasonable capital costs and low operating costs, and minimal waste production. In addition, the bioreactors of this disclosure are extremely flexible and adaptable; they may be designed as interchangeable modules that can be connected in various configurations and will accommodate changes in flow rate. These properties provide advantages over mechanical systems in smaller or more remote remediation targets, particularly those not served by the electrical grid.

DESCRIPTION OF THE PREFERRED EMBODIMENTS

The following description illustrates the manner in which the principles of this disclosure are applied, but is not to be construed as in any sense limiting the scope of the disclosure.

Figure 1:
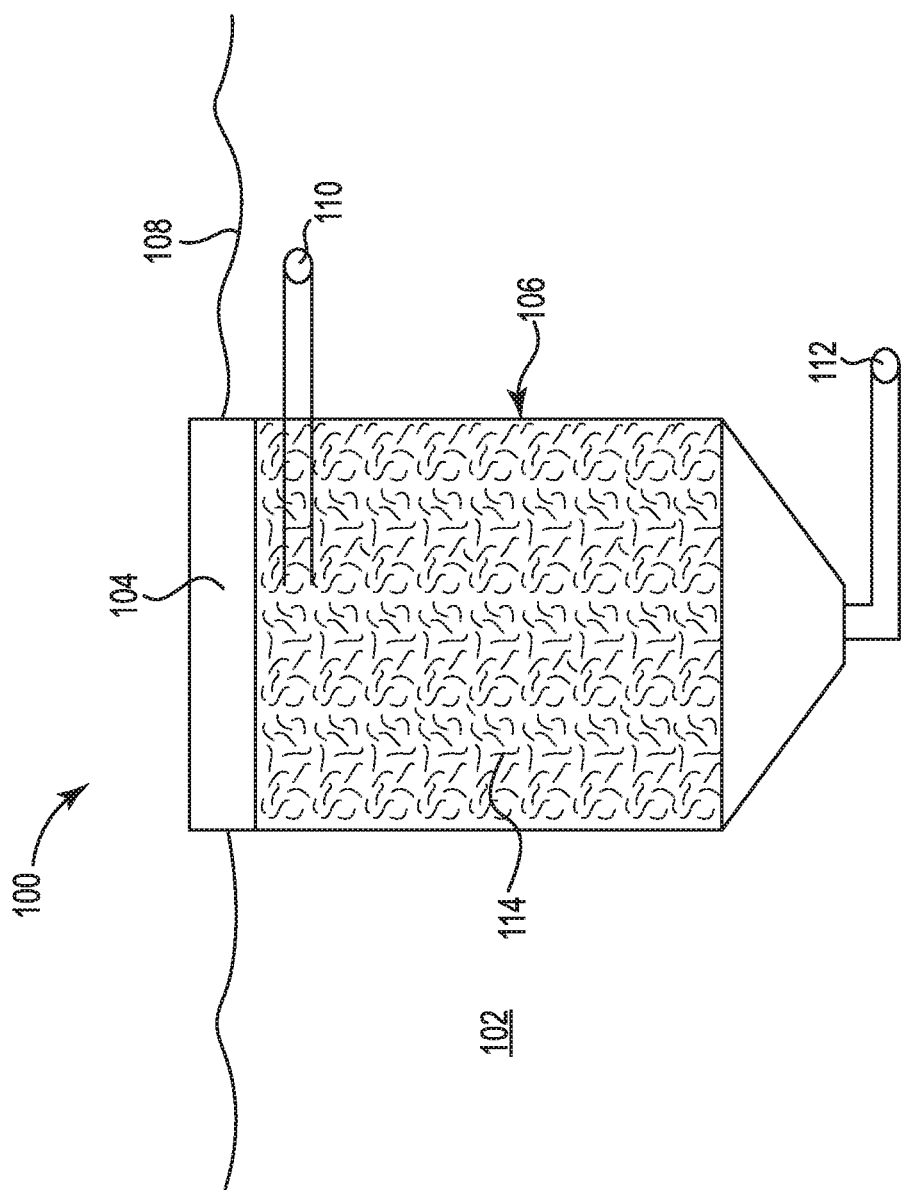
FIG. 1 is a schematic representation of a bioreactor in accordance with the principles of this disclosure.

More specifically, FIG. 1 schematically represents a bioreactor 100 floating in a body of water 102 in accordance with the principles of this disclosure. A flotation device 104, e.g. one comprising a plurality of flotation blocks, is attached to the first end of liquid-tight vessel 106, which allows the bioreactor 100 to float near the water surface 108 of the body of water 102 in which the bioreactor 100 is suspended or floating. The body of water 102 may be any body of water such as, for example, a mine pit, a lake, or a pond, any of which could be naturally occurring or man-made. The liquid-tight vessel 106 comprises a water inlet 110 and a water outlet 112. The water inlet 110 and a water outlet 112 may be equipped with means, e.g. screens or filters, for inhibiting entry of unwanted materials, including wildlife, organic debris (e.g., leaves) or inorganic debris, from liquid-tight vessel 106. In one embodiment, the water inlet 110 and/or water outlet 112 may comprise water-permeable areas in the wall of the liquid-tight vessel 106. Water inlet 110 and water outlet 112 are connected to liquid-tight vessel 106 and are arranged such that water from the body of water 102 may enter liquid-tight vessel 106 and such that a bioreactor effluent stream may be conducted to subsequent stages of treatment for hydrogen sulfide removal. Depending on the mode of operation of the bioreactor 100, as will be discussed hereinafter, water inlet 110 may be attached to liquid-tight vessel 106 at any location that will allow water from the body of water 102 to enter the liquid-tight vessel 106 and water outlet 112 may be to liquid-tight vessel 106 at any location that will provide an exit for the bioreactor effluent stream. For example, in one mode of operation, water from the body of water 102 enters liquid-tight vessel 106 via water inlet 110 located nearer to the lower end, or second end, of liquid-tight vessel 106, and a bioreactor effluent stream comprising treated water is conducted to subsequent stages of treatment for hydrogen sulfide removal via water outlet 112, which is located nearer to the first end of liquid-tight vessel 106 nearer to the water surface 108.

The liquid-tight vessel 106 contains a non-biodegradable polymeric fibrous media 114 to which a bacterial biofilm may attach. The non-biodegradable polymeric fibrous media 114 is capable of supporting a sulfate-reducing bacteria (SRB) biofilm. The non-biodegradable polymeric fibrous media 4 has a surface area density of at least 2000, or at least 3000, or at least 5000, or at least 6000 square meters ($m^2$) of non-biodegradable polymeric fibrous media 114 per cubic meter ($m^3$) of volume of the liquid-tight vessel 106.

Figure 2:
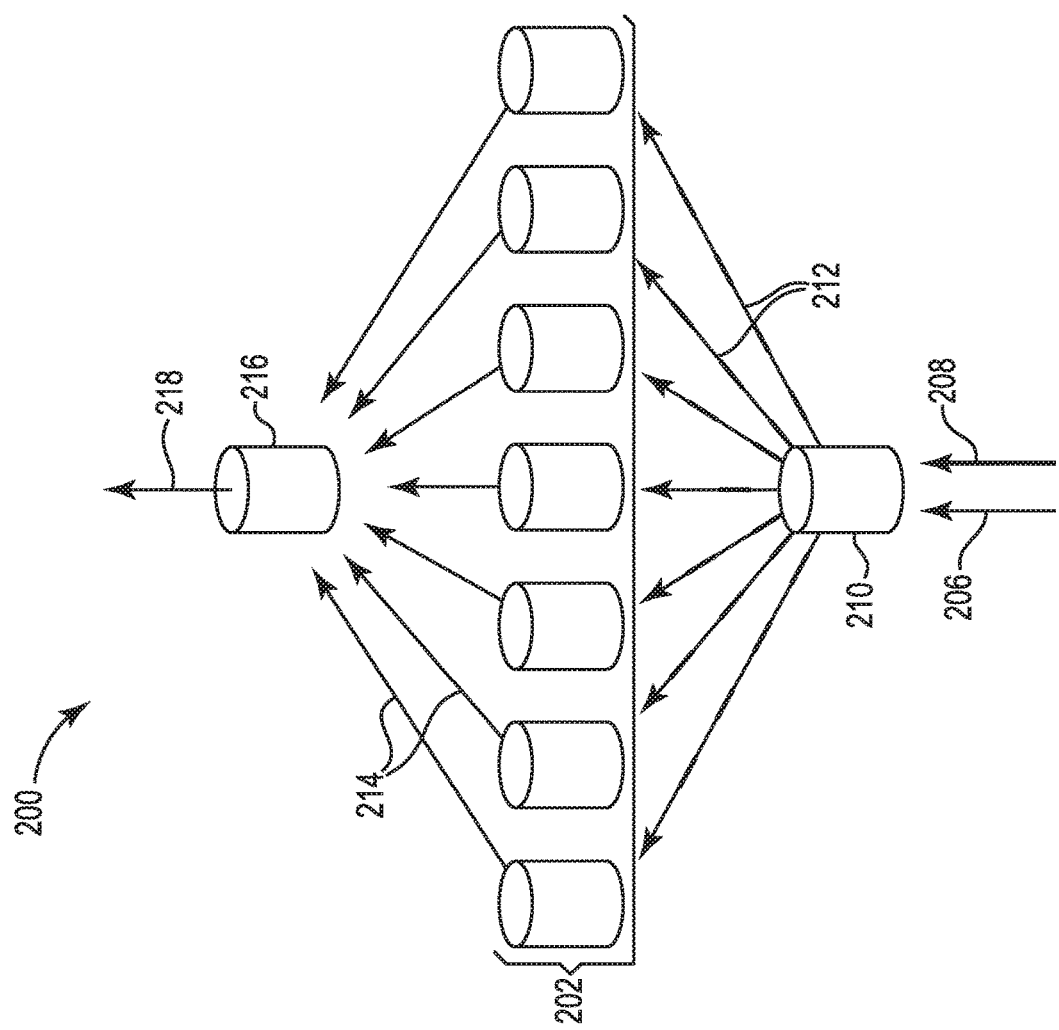
FIG. 2 is a schematic representation of a bioremediation platform system comprising a plurality of bioreactors in accordance with the principles of this disclosure.

FIG. 2 schematically represents a bioremediation platform system 200 comprising a plurality of bioreactors, 202. Input water 206 to be treated, and electron donor and/or nutrients 208, enter common inlet module 210. From common inlet module 210, bioreactor input streams 212 are sent to each of bioreactors 202. In some cases one or more bioreactors 202 may be shut down for maintenance or other reasons, so that not every reactor is operating. In bioreactors 202 bacterial biofilms convert sulfate to hydrogen sulfide or sulfide ions. Treated water exits bioreactors 202 via bioreactor effluents 214 and proceeds to common outlet module 216, which can be employed as a precipitation/settling tank. In common outlet module 216 the hydrogen sulfide or sulfide ions is treated by methods known to those skilled in the art to collect a precipitate, e.g. of FeS, elemental sulfur or a mixture of elemental sulfur and Fe(OH)$_3$ depending on the treatment system employed. These precipitates are then settled in common outlet module 216 and removed from the system via effluent stream 218.

As used herein, the term "surface area density" refers to the area, expressed in m$^2$, of the non-biodegradable polymeric fibrous media in a bioreactor per volume, expressed in cubic meters, of the liquid-tight vessel.

As used herein, the terms "common inlet vessel" and "common inlet module" are used interchangeably. Similarly, the terms "common outlet vessel" and "common outlet module" are used interchangeably.

As used herein, the term "liquid-tight vessel" refers to a vessel that is capable of holding liquids, such as, water.

As used herein, the term "flotation device" refers to a device or apparatus that is capable of providing buoyancy to the liquid-tight vessel.

The vessel may be constructed of any suitable material. In one embodiment, the vessel is constructed primarily of a polymeric material. Examples of suitable polymeric materials for the vessel include high density polyethylene (HDPE), polyvinlychoride (PVC) sheets, cross-linked HDPE vessels or low-density polyethylene (LDPE) vessels. The vessel may be constructed using a mixture of materials. The thickness of the wall of vessel 106 is not particularly critical. Advantageously, the wall of vessel 106 should be strong enough to provide structural integretity to vessel 106 against extreme temperatures and ice flows. In one embodiment, the wall of vessel 106 comprises a 60 mil sheet of HDPE. Other thicknesses and other materials may be employed to construct a flexible wall for vessel 106, as is within the ability of those skilled in the art. One advantage of using a vessel wall that is entirely or partially constructed using a flexible material is that vessel 106 will be somewhat failure resistant in environments, such as freezing Minnesota winters, where the surface of the pertinent body of source water may freeze and become solid to a depth of from a few inches to a few feet.

Similarly, the flotation device may be constructed of any suitable material. Examples of suitable materials for the flotation device include one or more polymeric foams, such as, expanded polystyrene foam (EPS), polypropylene foam, polyurethane foam and HDPE foam. In one embodiment, a commercially available dock float is employed as a flotation device. The flotation device may be constructed using a combination of materials.

In one embodiment, a liquid-tight vessel may optionally have a rigid frame deck to allow people easy access the vessel, e.g. a rigid wooden, composite, polymeric or metal frame may be provided with decking material to form a deck attached to a vessel. In one embodiment, an access port may be provided to the upper, or first, end of a vessel. For example, four 3'×4' dock floats, may be arranged together in a configuration that provides a 1 square foot opening in the center of the floats. In one embodiment, a liquid-tight vessel may support an on-board electrical storage battery and photovoltaic cells to provide electrical power. In one embodiment, such a battery can be located in an opening, such as the opening in the center of four dock floats as described above, and the opening can be provided with an insulated lid to keep the storage battery temperature consistent. In one embodiment, the flotation device allows people to walk on the top of the flotation device, e.g. dock floats, and the upper surface of the flotation device may be covered with a liner.

A bioreactor or a system may include conduit means, e.g. piping or other means of conducting materials, such as water or electron donor substrate, into and out of the reactor, or transporting water between modules in a bioremediation system. Those skilled in the art readily will be able to determine suitable diameters, lengths, gauges and materials of construction to employ using readily available engineering knowledge.

The non-biodegradable polymeric fibrous media acts as a support for the sulfate-reducing bacterial biofilm. The choice of fibrous media is not particularly important. In one embodiment, said media comprises fibers. such as synthetic carpet fibers. Examples of suitable fibers include fibers selected from the group consisting of polypropylene fibers, polyester such as polyethylene terephthalate (PET) fibers and nylon fibers. In one embodiment, the non-biodegradable polymeric fibrous media optionally comprises reclaimed, post-consumer carpet fibers wherein said fibers optionally are a blend of polypropylene, polyester (e.g., PET), nylon and/or polyethylene fibers. In one embodiment, the non-biodegradable polymeric fibrous media may be organic, such as when an organic polymer is employed.

The density of the fibrous media can be taken into account when designing vessel 106, as it is a factor that may influence the buoyancy of vessel 106. In a bioreactor vessel in which water flows up through vessel 106, called an upflow configuration, it may be desirable to use fibers having higher density compared to a situation in which water flows down through vessel 106, called a downflow configuration, in which case relatively lower density fibers may be desirable. Polypropylene carpet fibers have a density of about 0.91 gram per cubic centimeter (g/cc). Polyethylene terephthalate (PET) fiber has a density of about 1.35 g/cc, and thus may be more commonly employed in upflow configurations. Mixtures of fibers may be employed to adjust the density of the fibrous media.

One advantage of the bioreactor of this disclosure is that it provides much greater surface area compared to previous surface water environmental contaminant reduction bioremediation systems. In one embodiment, the non-biodegradable polymeric fibrous media has an average surface area of at least 0.01 square meter per gram (m$^2$/g), or 0.02 m$^2$/g, or 0.03 m$^2$/g, or 0.04 m$^2$/g of the non-biodegradable polymeric fibrous substrate. In various embodiments, the surface area density of the non-biodegradable polymeric fibrous media in a liquid-tight vessel is at least 2000, or at least 3000, or at least 5000, or at least 6000 m$^2$ of non-biodegradable polymeric fibrous media per cubic meter volume of the liquid-tight vessel. In one embodiment, total surface area of the fibrous media in the vessel is at least 30,000, or at least 45,000, or at least 75,000, or at least 90,000 square meters.

In one embodiment, the volume of the liquid-tight vessel contains water in an amount sufficient to provide a water filled void volume of from 75% to 95% by volume. In one embodiment, the water filled void volume of the liquid-tight vessel is at least 75%, or at least 85%, or at least 95% by volume.

As used herein, the term "void volume" refers to the volume in the liquid-tight vessel not occupied by the bacterial biofilm and the fibrous media. The void volume and volume occupied by the fibrous media and bacterial biofilm are related and add up to 100% of the volume of the liquid-tight vessel. As appreciated, the actual volume of the bacterial biofilm is relatively small.

In one embodiment, the fibrous media fills a relatively small fraction of the volume in vessel 106. In one embodiment, the fibrous media takes up from 5 to 15 percent, or from 8 to 12 percent, of the volume of vessel 106. When the fibrous media takes up 8 to 12 percent of the volume of the liquid-tight vessel, the remaining 92 to 88 percent is void volume. This advantageously allows treatment of more water per retention time as compared to a gravel media bioreactor with only 50% void volume, which will have about half the retention time for a given flow and total vessel volume.

Having a high void volume is advantageous, as it allows a large mass of water to be processed at a relatively low flow rate. High void volumes are possible with the bioreactor of this disclosure, as the surface area of the non-biodegradable polymeric fibrous media is relatively high. Both these factors permit the design of an effective and compact bioreactor for a given flow and sulfate removal rate.

It is possible to add ballast to the liquid-tight vessel, e.g. when using only low-density fibers, such as polypropylene fibers. Whether to do so depends on the density of the fibers and the buoyancy distribution of the bioreactor.

In one embodiment, the fibrous media is free floating in the interior of the liquid-tight vessel.

The vessel may also contain interior structure such as baffles or interior walls to influence the residence time and direction or distribution of water flow within the liquid-tight vessel. Techniques for the design and construction of the interior structures noted above are known to those skilled in the art.

In one embodiment, means are employed to retain the fibrous media inside of the liquid-tight vessel. Examples of said means include reverse flow traps, screens and grates, which are generally sufficient because fibers of the fibrous substrate are meshed or tangled together.

DETAILED DESCRIPTION

As used herein, the terms "a," "an," "the," "at least one," and "one or more" are used interchangeably. The terms "comprises" and "includes" and variations thereof do not have a limiting meaning where these terms appear in the description and claims. Thus, for example, "a" material can be interpreted to mean "one or more" materials, and a composition that "includes" or "comprises" a material can be interpreted to mean that the composition includes things in addition to the material.

For the purposes of this disclosure, the terms "water body" and "body of water" are used interchangeably.

Unless stated to the contrary, implicit from the context, or customary in the art, all parts and percentages are based on weight and all test methods are current as of the filing date of this disclosure.

For the purposes of this disclosure, sulfate concentration in water is determined per the EPA-300.0 IC Anions standard using the SulfaVer 4 Method 10248 by Hach Company or any other approved method.

This disclosure relates to the reduction of sulfate levels in water. For convenience and ease of reading, the term "sulfate" will be used hereinafter.

The method of the disclosure for the reduction of sulfate levels in surface water will now be described in detail.

In one embodiment, the process of the disclosure is a process for converting sulfate in the water to hydrogen sulfide, e.g. surface water, the process comprising providing a floating bioremediation platform system in a body of water in which a sulfate is present, where the non-biodegradable polymeric fibrous media in each liquid-tight bioreactor vessel supports a sulfate-reducing bacteria (SRB) biofilm; moving water from the body of water containing the sulfate through the volume of at least one of the liquid-tight vessels via a water inlet and a water outlet; and supplying the SRB biofilm growing on the non-biodegradable polymeric fibrous media with the necessary electron donor substrate and nutrients sufficient to allow them to survive and process sulfates to produce hydrogen sulfide.

The process of the disclosure advantageously can reduce the concentration of sulfate found in surface water, especially surface water wherein a major source of the sulfate is from industrial activity (such as mining, power generation, paper making or cellulose plants), municipal waste water plants or agricultural runoff. The source of input water is not particularly limited. Examples of bodies of water that may be the source of input water include mine pit lakes, industrial holding basins, natural lakes, ponds, streams and rivers. Preferably, the water fed to the process is in the liquid phase so that it can flow through the bioreactor vessels.

Any suitable SRB may be employed in the bacterial biofilm. Many species and strains of such bacteria are ubiquitous to these high sulfate environments and known to those skilled in the art. Thus, a bioreactor may contain a diverse anaerobic microbial community including multiple types of SRB, fermenters, and methanogens. Major genera of SRB in a reactor may include *Desulfovibrio, Desulfobacter* and *Desulfobulbus*. In one embodiment, prokaryotic cell concentrations in the water in a bioreactor may range from approximately 0.5 to $4.5 \times 10^7$ cells/ml. The rate of bacterial growth may be sensitive to the temperature in the bioreactor. Bacteria to populate the bacterial biofilm at startup may be grown in advance. If desired, a relatively small, initial number of bacteria may be introduced at startup and the full bacterial biofilm may be allowed to grow into place over time. The SRB that are ubiquitous to the surrounding environment will naturally populate the fibrous media inside the bioreactor vessel. As the population of the SRB grows it will increase the overall capacity of the system to reduce sulfate to hydrogen sulfide.

In one embodiment, bacteria present in the environment of the bioreactor system are introduced to a bioreactor and are grown in the bioreactor to form the bacterial biofilm. In one embodiment, SRB that come from sediments downstream of the process effluent stream and native to the environment are employed as at least part of the bacterial biofilm. In one embodiment, the bacteria are facultative anaerobic bacteria.

In addition to sulfate-rich water, the process inputs may include an electron donor, essentially bacterial food, e.g. ethanol, and a nutrient or fertilizer, e.g. a source of at least one of nitrogen and phosphorus, as needed to sustain the bacterial colony. The levels of food and nutrient in the effluent stream may be monitored to determine suitable operational levels.

In one embodiment, the process of the disclosure employs an electron donor. The electron donor serves to provide energy to the SRB and carbon for bacterial cell growth. Examples of electron donors include vegetable oil, ethanol, methanol, lactic acid, acetic acid, sodium lactate, sodium acetate, glycerol, sugars, molasses and ethyl lactate. The electron donor is employed in an amount sufficient to achieve the desired reduction in sulfate. In one embodiment, the amount of electron donor is determined by the input water flow rate and the amount of sulfate reduction desired. Mixtures of electron donors may be employed.

In one embodiment, nutrient is provided in an amount sufficient to sustain the bacterial biofilm.

The process may be operated in any manner desired, e.g. as a continuous, semi-continuous, or batch process, although continuous operation will be preferred in most cases.

Advantageously, the bioreactor may convert sulfate to sulfide. The sulfide may be in the form of, e.g. $H_2S$ when pH is below 7, or, at higher pH, soluble $HS^-$ ions.

The flow rate of water through a bioreactor is not particularly critical, provided that the flow is sufficient to allow the bacteria to remove sulfate from the sulfate-rich feed water at a desired rate. In various embodiments, the flow rate of input water to a bioreactor vessel is from 0.2 to 20 gallons per minute (gpm), or from 0.5 to 15 gpm, or from 1 to 12 gpm. In one embodiment, a pump may be employed to drive water through all or part of the system. In one embodiment, a pump feeds sulfate-rich water from the pertinent body of water to the system. However, in one embodiment, a pump is used to draw water out of the system, i.e. to pull water through the system.

In one embodiment, gravity may be used to drive flow between reactors or systems in case there are water bodies of different levels or heights are available to provide an adequate positive hydraulic pressure on the inlet or an adequate negative pressure on the outlet.

In one embodiment, the floating bioremediation platform system is capable of year round continuos 24 hour per day operation. However, the system may be operated on an intermittent basis if desired. The system is able to operate in certain environments that may be subjected to temperatures below the freezing point of water, due to certain design features, e.g. a flexible vessel wall, the capability for essentially submerging the bioreactor operation, and the ability to draw inlet water from well below the surface level of the relevant body of water. The temperature of the water stream entering a bioreactor advantageously is above the freezing point of water. In one embodiment, the input water is drawn from below the upper surface of the pertinent body of water. For example, the depth of the water inlet below the upper surface may be from 1 to 100, or 2 to 90, meters below the surface of the pertinent body of water. In one embodiment, the water is drawn from a depth that provides a uniform, or relatively uniform, inlet water temperature. In one embodiment, the depth of the inlet employed for the input water is a depth sufficient to reach water having a low dissolved oxygen (DO) concentration, i.e. a DO concentration of less than about 5 parts per million (ppm).

The process may be controlled using known equipment and control schemes. For example, the residence time, desired feed rates of input water, nutrient and electron donor may be determined by routine experimentation. Once the desired feed rate for a parameter is known, it may easily be controlled using techniques known to those skilled in the art. For example, in one embodiment, the flow rate of water may be controlled by setting a pump to the desired flow rate.

The process of the disclosure advantageously is operated in a manner sufficient to reduce the concentration of sulfate in the input water. While the federal government standards limit sulfate concentration to levels below 250 mg/L as a secondary drinking water standard, Minnesota currently has a specific standard for wild rice producing waters of 10 mg/L per EPA 300.0 IC Anion standard testing. The process of the disclosure provides an economically feasible route for reducing sulfates in water, especially surface water. In various embodiments, the concentration of sulfate per the EPA-300.0 IC Anions standard using the SulfaVer 4 Method 10248 by Hach Company or other approved method in the effluent stream of the process is less than 10 mg/L, or less than 50 mg/L, or less than 200 mg/L. In one embodiment, the water discharged by the process of the disclosure has an essentially neutral pH, e.g. a pH of from 6 to 8. In one embodiment, the process of this disclosure is capable of converting more than 90% of the sulfate in the feed water into hydrogen sulfide, and may achieve rates of sulfate reduction ranging from 60-100%.

In one embodiment, the bioremediation platform system is built around a series of modular bioreactor vessels, which are essentially sealed containers filled with the non-biodegradable polymeric fibrous media that serves as the microbial habitat or support. In this embodiment, the bioreactor vessels of the present disclosure are designed to float in a water body with slight positive buoyancy, allowing the bulk of the vessels to be submerged, which provides a protected environment for both biological and mechanical systems. Sets of bioreactor vessels operating in parallel may be joined to other vessels containing fibrous attachment media, carbon substrates that bacteria use as food sources, other nutrients, pumps, monitoring equipment, and other mechanical systems, to form platforms or systems also referred to herein as rafts. A raft may also contain independent hydraulic, monitoring, and power systems, which may comprise with solar photovoltaic panels with propane-fueled generators for backup, or exclusively solar photovoltaics. Physico-chemical, hydraulic, and electrical parameters may be monitored at multiple points throughout the process, and the rafts may be designed and fitted for remote monitoring and control.

The bioremediation system preferably is designed to operate and function effectively in a body of water, such as a mine pit lake, throughout the year, even in environments, such as northeast Minnesota, where the ambient temperature may be well below the freezing point of water.

The bioremediation platform system may include a common inlet vessel or common inlet module. If employed, the common inlet vessel can act as a central point for introducing materials into the system. For example, the common inlet vessel may be employed as the water intake module for the platform. In addition to inlet water, other system inputs such as, for example, the electron donor and the nutrient may be introduced to the system via the common inlet vessel. The common inlet vessel may be connected to one or more bioreactor vessels in any manner desired, e.g. in series, in parallel, or using a combination of series and parallel connections. Thus, materials introduced to the system via the common inlet vessel may be distributed to other parts of the bioremediation platform system as desired.

In one embodiment, the system further comprises a common inlet module, a common outlet module, means for water flow between the modules and the bioreactors, a pump, and means for controlling the flow rate of water into the system.

The bioremediation platform system may include a common outlet vessel or common outlet module. If employed, the common outlet vessel can act as a central point for receiving effluent streams from the bioreactors and removing materials from the system. For example, the common outlet vessel may be employed as the water outlet for the platform. In addition, various well-known post-treatment processes, such as effluent treatment to convert hydrogen sulfide to metal sulfide precipitates or elemental sulfur precipitates, may be conducted in the common outlet vessel as desired. For example, known chemical methods to precipitate various sulfur species may be employed. The common outlet vessel may be connected to one or more bioreactors in any manner desired, e.g. in series, in parallel, or using a combination of series and parallel connections. Thus, materials from the bioreactors may be collected in the common outlet vessel as desired.

In one embodiment, modular, controlled condition, bioreactors are employed for the biological reduction of sulfate to hydrogen sulfide, with sulfide removal by precipitation being done outside the bioreactors. This reduces the risk of accumulations of solids and fouling the bioreactor support media. It also allows scaling up of the biological system with multiple bioreactor modules to handle any influent flow required, as the bioreactors may all feed their effluent streams into a single effluent treatment system for hydrogen sulfide treatment and removal. In most cases this additional treatment is necessary to deal with the hydrogen sulfide produced, as it is relatively toxic to many plant and animal species. This additional treatment system can use one of several known treatment systems to convert the produced hydrogen sulfide to 1) an iron salt such as FeS using $FeCl_2$ or $FeCl_3$, 2) elemental S using $H_2O_2$, or 3) a mix of elemental S and $Fe(OH)_3$ using $FeCl_2$ and $H_2O_2$ to regenerate the Fe. Any of these treatment systems may precipitate the residue in settling tanks or clarifiers after the biological reaction. This separation allows for precipitate removal from the system on a regular or continuous basis while avoiding any fouling of the biological process inside the bioreactors.

Another advantage of the bioreactor, system, and process of this disclosure is that this process does not create significant quantities of precipitated sludge inside of the bioreactor vessel compared to prior art processes that create precipitates within the bioreactor vessel.

In one embodiment, one or more bioreactors may be situated on land rather than in water. In this case, the system may need to be engineered to withstand and operate in subfreezing conditions, depending on the location of the system. In one embodiment, one or more bioreactors may be located underground, or in an enclosure. A land-based bioreactor or system may employ a bioreactor substantially similar to the bioreactor 100 shown in FIG. 1.

Specific embodiments of this disclosure are provided in this paragraph, and include a modular, sulfate-reducing bioreactor that converts sulfate to dissolved sulfides. The modular, flexible skin bioreactor has a controlled inlet and outlet to monitor performance and control operating parameters. Inside the bioreactor is the non-biodegradable, ultra-high surface area, near neutral buoyancy, fibrous attachment media for SRB to attach to while high sulfate influent water comprising electron donor and nutrients flows over them. Each bioreactor module is floated in the mine pit lake or containment basin with the flotation deck slightly above water level and the complete bioreactor volume suspended below the water level of the lake or basin. Suspending the bioreactor modules under water allows for year-round operation while minimizing contact with atmospheric air to maintain anaerobic reducing conditions inside the bioreactors. The ultra-high surface area of the fibrous attachment media and the inexpensive construction of the bioreactor modules allows for higher flow rates than previously achievable, translating to lower capital costs and excellent, cost efficient performance.

Figure 3:
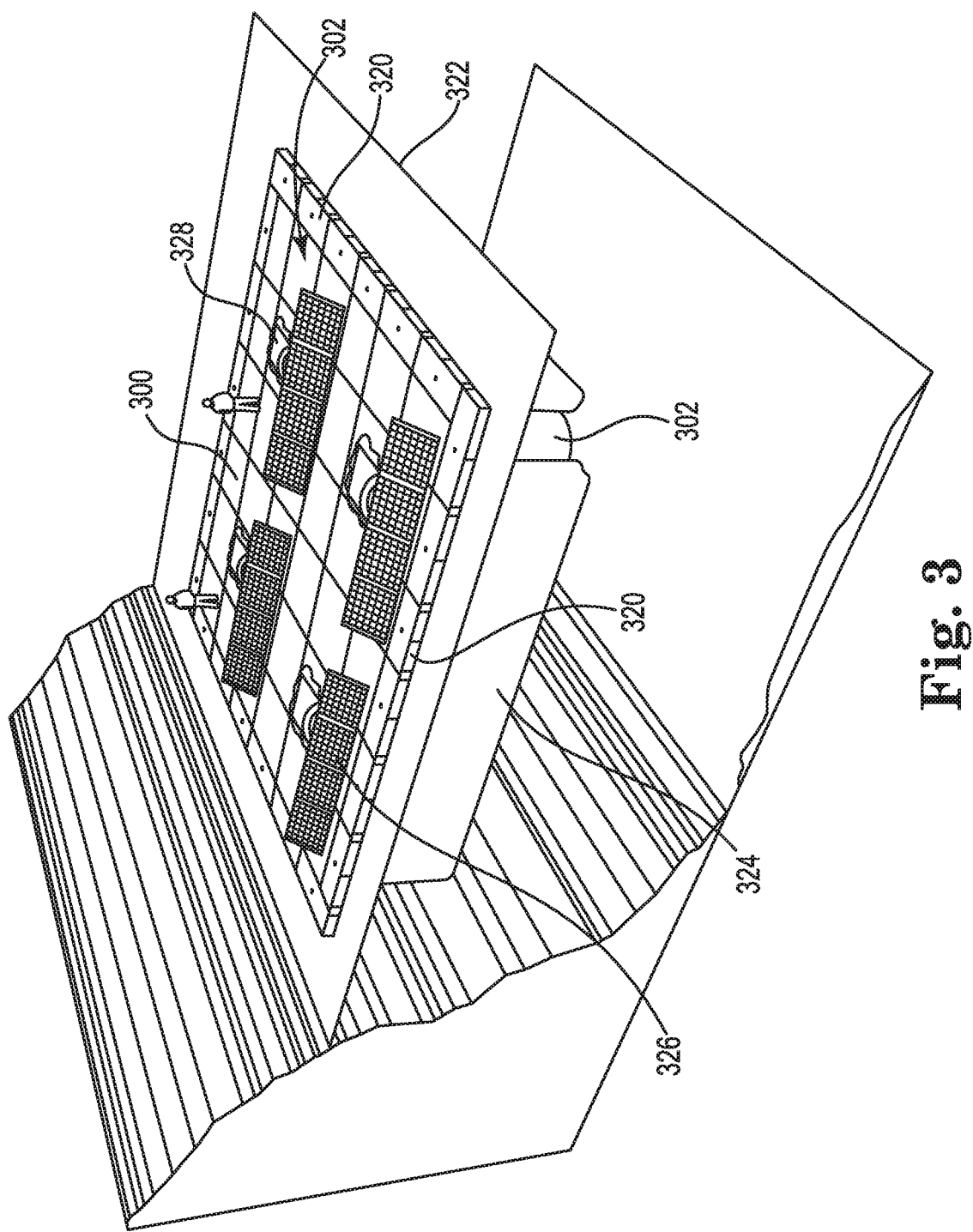
FIG. 3 is a schematic representation of a bioremediation platform system comprising a plurality of bioreactors in accordance with the principles of this disclosure.

FIG. 3 provides an illustration of the bioremediation platform system 300 of the present disclosure. As illustrated in FIG. 2, above, the bioremediation platform system 300 comprising a plurality of bioreactors 302, where the bioreactors are as described herein (e.g., as seen and described in FIG. 1). For the present embodiment, the bioremediation platform system 300 include thirty-two (32) of the bioreactors 302. As discussed herein, each of the bioreactors 302 is a liquid-tight vessel having a volume, where the liquid-tight vessel includes a water inlet and a water outlet. Each of the liquid-tight vessels also includes the non-biodegradable polymeric fibrous media, where the non-biodegradable polymeric fibrous media is capable of supporting the sulfate-reducing bacterial biofilm, as discussed herein. As noted herein, each of the bioreactors includes an amount of the non-biodegradable polymeric fibrous media to provide a surface area density of at least 2000, or at least 3000, or at least 5000, or at least 6000 square meter ($m^2$) of the non-biodegradable polymeric fibrous media per cubic meter volume of the liquid-tight vessel.

The bioremediation platform system 300 seen in FIG. 3 also illustrates additional perimeter flotation devices 320 so as to provide the bioremediation platform system 300 protection from ice and floating debris while floating in the body of water 322. As illustrated, the bioremediation platform system 300 is built around a series of modular bioreactor vessels, where each bioreactor is essentially a sealed container filled with the non-biodegradable polymeric fibrous media that serves as the microbial habitat or support. In this embodiment, the bioreactor vessels of the present disclosure float in a body of water 322 with slight positive buoyancy, allowing the bulk of the vessels to be submerged, which provides a protected environment for both biological and mechanical systems. As illustrated in FIG. 3, the bioreactor system 300 floats in the body of water so that the liquid-tight vessels are kept below a major surface of the body of water 322.

The bioreactor vessels 302 operate in parallel and are joined to other vessels 302 containing the fibrous attachment media. The bioremediation platform system 300 further includes a source 324 of carbon substrates along with other electron donor and nutrients that bacteria use as food sources. The bioremediation platform system 300 also includes a power source 326 that can be used to operate the pumps and monitoring equipment in order to operate the system and the bioreactor vessels as discussed herein. As provided herein, the bioremediation platform system 300 can also be referred to as a "raft" as the system 300 is able to support the weight of one or more individuals.

As illustrated, the power source 326 seen in FIG. 3 are solar photovoltaic panels, where propane-fueled generators can be used as backup if so desired. Physical, chemical, hydraulic, and electrical parameters may be monitored at multiple points throughout the process, and the rafts may be designed and fitted for remote monitoring and control, where the devices for such actions are known.

As noted above, the bioremediation platform system 300 include thirty-two (32) of the bioreactors 302. For the present embodiment, the thirty-two bioreactors 302 are divided into four (4) "rafts" each with eight (8) bioreactors 302. The bioremediation platform system 300 also includes a central precipitation module 328. For the present embodiment, each of the eight (8) bioreactors 302 of a raft is associated with and surrounds a central precipitation module 328 as seen in FIG. 3. The central precipitation module 328 acts to collect effluent from each of the bioreactors 302 (e.g., the treated water from each of the eight (8) bioreactors 302) in a common effluent pipe (seen in FIG. 4, below). The central precipitation module 328 further includes an outlet module (seen in FIG. 4, below) that receives and treats the collected effluent with hydrogen sulfide and/or sulfide ions so as to form a precipitate (e.g. FeS, elemental sulfur or a mixture of elemental sulfur and $Fe(OH)_3$ depending on the treatment system employed). These precipitates settle in and are removed from the outlet module of the system 300.

Figure 4:
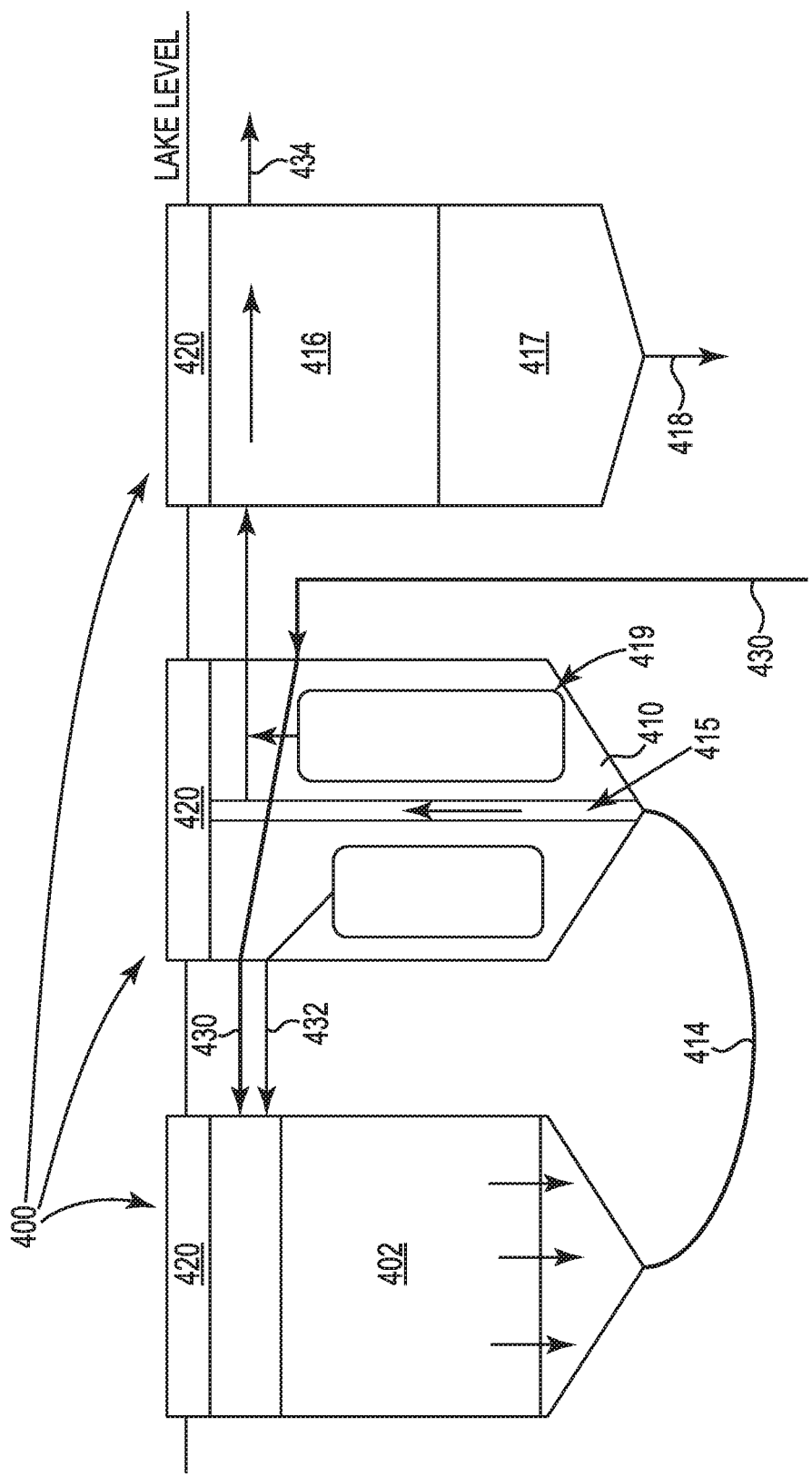
FIG. 4 a schematic representation of a bioreactor in accordance with the principles of this disclosure.

FIG. 4 shows a flow diagram for the movement of the water 430 from the body of water into and through the bioremediation platform system seen in FIG. 3 for the removal of the sulfate from water. As seen in FIG. 4, water 430 with sulfate is provided to the inlets of the bioreactors 402, where each of the bioreactors 402 includes the non-biodegradable polymeric fibrous media that support the sulfate reducing bacterial biofilm. The water moves through the volume of the liquid-tight vessels using the water inlet and the water outlet, where the movement of the water can be through the use of gravity and/or pumps, as discussed herein. An electron donor (e.g., nutrient blend) 432 is also supplied to the sulfate reducing bacterial biofilm within each of the bioreactors 402 such that the at least one sulfate in the water is converted to a different chemical species. As previously noted, a pump and means for controlling the pump are used to provide a flow rate of the water 430 into and out of the liquid-tight vessel through the water inlet and the water outlet of the bioreactors 402.

FIG. 4 also provides an additional embodiment of the bioremediation platform system 400 which includes at least one of a common inlet module and a common outlet module, means for water flow between at least one of said modules and at least one bioreactor, a pump, and means for controlling the flow rate of water into the system. As seen in FIG. 4, the water 430 with sulfate can enter the inlets of the bioreactors 402 from a common inlet module 410. The water moved from the body of water containing the sulfate to the bioreactors 402 of the bioremediation platform system 400 can be drawn from a location at least 2 meters below the surface of the body of water. This later embodiment allows for the bioremediation platform system 400 to have floating bioreactors, where the bioreactors are floating in a body of water and the entirety of the internal volume of the bioreactors are totally flooded such that moving water from the body of water containing the sulfate includes drawing the water from a location at least 2 meters below the surface of the body of water.

The effluent 414 from each of the bioreactors 402 (e.g., the treated water from each bioreactor 402) is then collected in a common effluent pipe 415 and on to outlet module 416 where the hydrogen sulfide and/or sulfide ions are treated with effluent treatment 419 so as to form a precipitate (e.g. FeS, elemental sulfur or a mixture of elemental sulfur and $Fe(OH)_3$ depending on the treatment system employed). These precipitates 417 settle in common outlet module 416 and are removed from the system via stream 418. The water having had sulfates removed exits the common outlet module via stream 434, where it can be returned to the body of water or go on for further chemical treatment as desired.

Specific embodiments of this disclosure are provided in this paragraph, and include a modular, sulfate-reducing land-based bioreactor that converts sulfate to dissolved hydrogen sulfide. The modular bioreactor has a controlled inlet and outlet to monitor performance and control operating parameters. Inside the bioreactor is a non-biodegradable, ultra-high surface area, near neutral buoyancy, fibrous attachment media for SRB to attach to while high sulfate influent water comprising electron donor and nutrients flows over them. Depending on the climate, the bioreactor modules may be installed underground to allow for year-round operation while minimizing contact with atmospheric air to maintain anaerobic reducing conditions inside the bioreactors. In one embodiment, if a bioreactor or system is used in a warm climate, e.g. a climate with little to no risk of encountering freezing temperatures, then it may be installed above ground. While a bioreactor or system may be installed in a building or enclosure, there may be additional costs associated with doing so. The ultra-high surface area of the fibrous attachment media and the inexpensive construction of the bioreactor modules allows for higher flow rates than previously achievable, translating to lower capital costs and excellent, cost efficient performance.

Specific Embodiments

Example 1 Individual Floating Bioreactor

An individual floating bioreactor module uses a flexible, HDPE, fabricated liquid-tight vessel that is suspended in a mine pit lake. The upper portion of this flexible liquid-tight vessel has 12" thick flotation blocks (made from commercially available dock floats) built in. The blocks are connected together so that they form a rigid upper deck and keep the top of the bioreactor deck floating 6" to 10" above the surface of the mine pit lake. Thus, the 15 $m^3$ (4,000 gal) submerged liquid-tight vessel has no contact with ambient air and is therefore isolated from ambient oxygen and extreme temperature swings. The water in the submerged liquid-tight vessel never freezes. Multiple bioreactor modules can be rafted together to form a bioreactor system to handle any desired flow.

The submerged liquid-tight vessel is filled with a non-biodegradable polymeric fibrous media for sulfate-reducing bacteria (SRB) to grow on. This non-biodegradable polymeric fibrous media has over 6,000 $m^2/m^3$, or over 90,000 $m^2$ total, of attachment surface area. The void volume in the liquid-tight vessel of the bioreactor is over 90% to allow for even water flow and a long hydraulic retention time (HRT). The non-biodegradable polymeric fibrous media is made of a blend of polypropylene and PET fiber of varied lengths that are specifically blended to provide the desired average specific gravity and near neutral buoyancy. The near neutral buoyancy and large void volume minimizes the chance of packing or plugging of the fibrous media bed. The design buoyancy is significantly different for upflow versus downflow bioreactors. A system of screens and traps is incorporated into the liquid-tight vessel to effectively contain the fibrous media within the confines of the liquid-tight vessel of the bioreactor.

There are reversible inlet and outlet ports on the bioreactor where the influent and effluent characteristics of the bioreactor can be monitored. The flow of water may be altered as desired so that an inlet port becomes an outlet port, and vice versa. At these points various variables, e.g. the water chemistry, can be regularly monitored, including variables such as flow rates, pH, oxygen reduction potential, temperature, sulfate and hydrogen sulfide concentrations, and the results of the monitoring can be employed to control sulfate reduction performance.

The mine pit lake, or basin, water is moved through the bioreactor by either gravity flow or low-pressure head pumps. Because the bioreactor vessels are submerged within the water body being treated, there is very little energy or pressure head needed to drive water through the bioreactor.

A liquid phase electron donor and nutrient blend is fed on a continuous basis into the inlet of the bioreactor. The feed rate of the electron donor and nutrient blend is controlled to achieve a desired sulfate reduction at a given flow rate and can be adjusted to optimize bioreactor performance. The liquid electron donor and nutrient blend is specifically formulated to provide the necessary carbon and energy for the SRB as well as to achieve the desired specific gravity and viscosity for the constant flow, electron donor dosing system.

Example 2 Bioremediation Platform System

A bioremediation platform system comprising 7 individual bioreactor modules is built. This system is assembled as a floating raft. The individual bioreactor modules have flow rates that range from 2 to 50 l/min depending on how much sulfate reduction is need. The effluents from the bioreactors feed into a common, composite effluent per raft of 14 to 350 l/min with a footprint of only 36 m2. After all bioreactors are operating effectively and consistently, performance monitoring can be done only on the composite effluent flow of this group of bioreactors thereby minimizing monitoring costs. If the performance of a raft of bioreactors is detected as being underperforming, then each individual bioreactor module can be monitored to determine quickly where the problem is for corrective action to be taken. This ability to monitor and manage individual bioreactor modules is fundamental to being able to maintain overall performance as the size of a system is scaled up. With this bioreactor design concept, any desired flow of water can be treated for the reduction of sulfate by merely adding additional bioreactor modules.

The effluent from a biological sulfate-reducing bioreactor can have a hydrogen sulfide concentration of more than 300 mg/L. This hydrogen sulfide is foul-smelling and relatively toxic to plant and animal life. If it is not removed from the system effluent stream would eventually be oxidized back to sulfate in aerobic surface waters. It could also potentially enter the atmosphere as a greenhouse gas. Therefore, the hydrogen sulfide advantageously is treated using known methods to sequester the sulfur and remove it from the system.

After the treatment of the hydrogen sulfide to produce a metal sulfide or elemental sulfur the precipitates are be collected in settling tanks or concentrated with a primary clarifier to create a concentrated sludge. The precipitated solids in the sludge are composed primarily of FeS or elemental sulfur depending on which sulfide treatment chemistry is used to remove the sulfide.

Example 3 Bioremediation Platform System Operation

A bioremediation platform system is built comprising Raft A and Raft B, each with 7 bioreactors and a central effluent treatment module. These 14 bioreactor modules are then operated for over 3 years. Results over this time period regularly reduced over 90% of the approximately 1,100 mg/L of sulfate in the pit lake water. In winter months the system achieves sulfate reduction from a low of 60% up to total reduction with 100% sulfate conversion to hydrogen sulfide. Some of the test results are shown in Table A. In this table, each bioreactor is given a designation, with A1 being bioreactor 1 in Raft A, for example.

TABLE A

Effluent Sulfate & Sulfide Results of Individual Bioreactors

| January Raft A | Sulfate mg/L | Sulfide mg/L | July Raft B | Sulfate mg/L | Sulfide mg/L | September Raft B | Sulfate mg/L | Sulfide mg/L |
|---|---|---|---|---|---|---|---|---|
| A1 Bioreactor Eff. | 0 | 279 | B1 Bioreactor Eff. | 29 | 294 | B1 Bioreactor Eff. | 36 | 322 |
| A2 Bioreactor Eff. | 270 | 205 | B2 Bioreactor Eff. | 21 | 310 | B2 Bioreactor Eff. | 127 | 288 |
| A3 Bioreactor Eff. | 17 | 318 | B3 Bioreactor Eff. | 13 | 311 | B3 Bioreactor Eff. | 13 | 323 |
| A4 Bioreactor Eff. | 483 | 98 | B4 Bioreactor Eff. | 9 | 336 | B4 Bioreactor Eff. | 14 | 354 |
| A5 Bioreactor Eff. | 280 | 200 | B5 Bioreactor Eff. | 9 | 316 | B5 Bioreactor Eff. | 9 | 337 |
| A6 Bioreactor Eff. | 0 | 319 | B6 Bioreactor Eff. | 198 | 183 | B6 Bioreactor Eff. | 14 | 339 |
| A7 Bioreactor Eff. | 0 | 314 | B7 Bioreactor Eff. | 11 | 305 | B7 Bioreactor Eff. | 11 | 369 |

This data demonstrates how 3 of 7 bioreactors on Raft A achieve total sulfate reduction for a sampling in January. Another bioreactor achieves 17 mg/L of sulfate in its effluent. The fact that 4 bioreactors have excellent results while the other 3 have mediocre reduction rates of 76%, 56% and 75% shows the importance of monitoring and managing all bioreactors for maximum performance. Although 56% and 75% sulfate reduction on an influent of 1,100 mg/L can be considered acceptable performance compared to most of the prior art bioreactors described above, it is obviously not even close to the 100% reduction that can be achieved, even in the winter.

The other two sets of data in Table A from September show excellent performance on 6 of the 7 bioreactors. Each time 6 bioreactors have sulfate reduction of 97% or better from 1,100 mg/L inlet water. The poorest bioreactor performance observed in July, B6, had 83% sulfate reduction. The poorest bioreactor performance observed in September is B2 with sulfate reduction of 88%. It is again noteworthy to see how the results of B6 bioreactor in July and the B2 bioreactor in September stand out as units that need attention even though they have good sulfate reduction. Being able to identify and troubleshoot underperforming bioreactors is fundamental in being able to assure overall performance of the complete system.

The level of hydrogen sulfide being produced inside these bioreactors is also important to note. Stoichiometrically, the total reduction of 1,100 mg/L of sulfate to hydrogen sulfide would yield 349 mg/L of hydrogen sulfide. These results demonstrate nearly a perfect stoichiometric conversion to hydrogen sulfide as $HS^-$ ion without losing $H_2S$ due to gassing off.

This concentration of >300 mg/L of hydrogen sulfide must then be treated to collect a precipitate of FeS, elemental sulfur or a mixture of elemental sulfur and $Fe(OH)_3$ depending on the treatment system employed. These precipitates are successfully settled in tanks downstream from the bioreactors and pumped out for removal from the system.

What is claimed:

1. A bioreactor, comprising:
a liquid-tight vessel having a volume, the liquid-tight vessel having an inlet and an outlet, wherein the liquid-tight vessel comprises a flexible wall, and optionally wherein the wall comprises a water-tight, flexible polymeric bladder fabricated from a flexible polymer sheet;
a non-biodegradable polymeric fibrous media in the liquid-tight vessel, wherein the non-biodegradable polymeric fibrous media is capable of supporting a sulfate-reducing bacterial biofilm and wherein the surface area density of the non-biodegradable polymeric fibrous media in the bioreactor is at least 2000, or at least 3000, or at least 5000, or at least 6000, square meter ($m^2$) of non-biodegradable polymeric fibrous media per cubic meter volume of the liquid-tight vessel.

2. The bioreactor of claim 1 wherein the non-biodegradable polymeric fibrous media have an average surface area of at least 0.01 $m^2/g$, or 0.02 $m^2/g$, or 0.03 $m^2/g$, or 0.04 $m^2/g$ of the non-biodegradable polymeric fibrous media.

3. The bioreactor of claim 1 wherein the non-biodegradable polymeric fibrous media comprises synthetic carpet fibers.

4. The bioreactor of claim 1 wherein the non-biodegradable polymeric fibrous media comprises fibers selected from the group consisting of polypropylene fibers, polyethylene terephthalate (PET) fibers and nylon fibers, and wherein the non-biodegradable polymeric fibrous media optionally comprise reclaimed, post-consumer carpet fibers and optionally are a blend of polypropylene, PET, nylon and/or polyethylene fibers.

5. The bioreactor of claim 1 wherein the liquid-tight vessel is filled with water to provide a void volume of 75% to 95%.

6. The bioreactor of claim 1 wherein the liquid-tight vessel comprises a flexible wall and a void volume, and wherein the void volume in the reactor is at least 75%, or at least 85%, or at least 95% by volume.

7. The bioreactor of claim 6 further comprising a pump to provide a flow rate of water into and out of the liquid-tight vessel through the inlet and the outlet.

8. The bioreactor of claim 1 further comprising a flotation device secured to the liquid-tight vessel.

9. A bioremediation platform system comprising a plurality of bioreactors, wherein a bioreactor comprises:
a liquid-tight vessel having a volume, the liquid-tight vessel having an inlet and an outlet, wherein the liquid-tight vessel comprises a flexible wall, and optionally wherein the wall comprises a water-tight, flexible polymeric bladder fabricated from a flexible polymer sheet;
a non-biodegradable polymeric fibrous media in the liquid-tight vessel, wherein the non-biodegradable polymeric fibrous media is capable of supporting a sulfate-reducing bacterial biofilm and wherein the bioreactor includes an amount of the non-biodegradable polymeric fibrous media to provide a surface area density of at least 2000, or at least 3000, or at least 5000, or at least 6000 square meter ($m^2$) of the non-biodegradable polymeric fibrous media per cubic meter volume of the liquid-tight vessel.

10. The bioremediation platform system of claim 9, wherein the system further comprises at least one of a common inlet module and a common outlet module, means for water flow between at least one of said modules and at least one bioreactor, and a pump controlling the flow rate of water into the system.

11. The bioremediation platform system of claim 9 wherein the system includes a flotation device so as to be capable of floating in water.

12. A process for removing sulfate from water, the process comprising:
providing water with sulfate to the inlet of a bioreactor of claim 1, where the non-biodegradable polymeric fibrous media in the liquid-tight vessel supports a sulfate-reducing bacterial biofilm;
moving the water through the volume of the liquid-tight vessel using the inlet and the outlet; and
supplying the sulfate-reducing bacterial biofilm with an electron donor under conditions such that the at least one sulfate in the water is converted to a different chemical species.

13. The process of claim 12, further including floating the bioreactor in a body of water so that the liquid-tight vessel is kept below a major surface of the body of water.

14. The process of claim 12, wherein moving water from a body of water containing the sulfate includes drawing the water from a location at least 2 meters below the surface of the body of water.

15. The process of claim 12, further comprising producing an aqueous effluent stream having a concentration of sulfate of less than 10 mg/L, or less than 5 mg/L, or less than 2 mg/L, per the EPA-300.0 IC Anions standard.

16. The process of claim 12 wherein the bioreactor is floating in a body of water.

17. The process of claim 12, wherein the bioreactor is floating in a body of water, wherein the entirety of the internal volume of the bioreactor is totally flooded and wherein moving water from the body of water containing the sulfate includes drawing the water from a location at least 2 meters below the surface of the body of water.

18. The process of claim 12 wherein an electron donor and a source of nutrients for the bacteria is fed to the bioreactor.

* * * * *